UNITED STATES PATENT OFFICE 2,567,145

METHOD OF PREPARING URANIUM PENTAFLUORIDE

Charles J. Carignan, Cranston, R. I., assignor to the United States of America as represented by the United States Atomic Energy Commission No Drawing. Application December 7, 1945, Serial No. 633,541

4 Claims. (Cl. 23—14.5)

This invention relates to the preparation of uranium pentafluoride. More particularly, it relates to an improved method for the production of anhydrous uranium pentafluoride, which is especially suitable to be converted to uranium tetrafluoride and uranium hexafluoride by disproportionation.

Uranium tetrafluoride and uranium hexafluoride are compounds which have a considerable commercial value. While numerous methods are available for producing uranium tetrafluoride in large quantities, the usual method for the production of uranium hexafluoride is by reacting uranium tetrafluoride with elemental fluorine. This method, however, is subject to the disadvantages that elementary fluorine is costly and extremely difficult to handle.

Ruff and Heinzelmann in Z. Anorg. Chem. 72, 63, 71 (1911) report that uranium pentachloride was treated by cooking with anhydrous hydrogen fluoride until hydrogen chloride was no longer evolved. The supernatant layer of hydrogen fluoride was then poured off and a gray to bright-green powder, $UF_5.xHF$, was produced. This powder was then heated strongly and rapidly decomposed to uranium tetrafluoride and uranium hexafluoride. The uranium hexafluoride produced was associated with hydrogen fluoride and the uranium hexafluoride was not readily separated from the uranium hexafluoride-hydrogen fluoride mixture.

It is therefore the object of this invention to provide a process to prepare uranium pentafluoride in substantially pure form, which compound will be readily adaptable to be disproportionated into uranium tetrafluoride and uranium hexafluoride in substantially pure form.

Now, in accordance with this invention an improved method has been found for preparing anhydrous uranium pentafluoride, $UF_5$, which is especially suitable to be used for the preparation of uranium tetrafluoride and uranium hexafluoride by disproportionation. This method comprises reacting a material selected from the group consisting of uranium pentachloride, uranium hexachloride and mixtures thereof with anhydrous hydrogen fluoride, subsequently heating the reaction product, under vacuo, and recovering anhydrous uranium pentafluoride. The reaction is carried out preferably at a temperature within the range of between −33° C. and 25° C. However, if suitable pressure equipment is used, higher temperature may be employed.

It has been found that by causing uranium pentachloride to react with anhydrous hydrogen fluoride according to the method of this invention, substantially pure uranium pentafluoride, $UF_5$, is obtained in accordance with the following reaction:

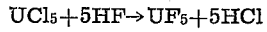

$$UCl_5 + 5HF \rightarrow UF_5 + 5HCl$$

Furthermore, substantially pure uranium pentafluoride, $UF_5$, is obtained, in accordance with the method of this invention, by reacting uranium hexachloride with anhydrous hydrogen fluoride probably in accordance with the following reaction:

$$2UCl_6 + 10HF \rightarrow 2UF_5 + 10HCl + Cl_2$$

Now, having indicated in a general way, the nature and purpose of this invention, the following examples will illustrate the invention. It is to be understood, however, that such examples are presented merely as illustrations of the invention and are not to be construed as limiting the same. In the examples, the ingredients are given in parts by weight, unless otherwise indicated.

Example 1

Two parts of uranium pentachloride were placed in a platinum-lined nickel reaction vessel provided with means for evacuation, and the reaction vessel was sealed and evacuated. 10 parts of anhydrous hydrogen fluoride were admitted and were condensed on the uranium pentachloride at Dry Ice temperatures, i. e. −78° C. The reaction vessel was again sealed and was slowly warmed to about 25° C. over a period of 1 hour, and allowed to stand, with occasional shaking, for 2 hours.

After the reaction was complete, excess hydrogen fluoride and gaseous reaction products were removed by heating the reaction product at a temperature of about 25° C., under a vacuo of $1 \times 10^{-3}$ mm. Hg. The remaining product when analyzed was anhydrous uranium pentafluoride, $UF_5$, which was white in color.

Example 2

Example 1 was repeated, except that the reaction mixture was allowed to stand for 17 hours rather than 2 hours. The resulting product was anhydrous uranium pentafluoride, $UF_5$, which was white in color.

Example 3

Thirty grams of anhydrous HF were condensed on 7.6 g. of a $UCl_6$-$UCl_5$ mixture containing 98.8% $UCl_6$ according to the general technique and apparatus described in Example 1. After standing about 17 hours at 25° C., the HF and gaseous reaction products (HCl and $Cl_2$)

$1 \times 10^{-3}$ mm. Hg. The product was white in color and, on analysis, gave 71.34% U; calculated for UF₅, 71.48% U.

*Example 4*

The procedure was the same as that in Example 1 except that 21.0 g. of a UCl₅-UCl₆ mixture containing 96% UCl₆ was reacted with 30 g. HF for 10 hours at 25° C. A snow-white product resulted.

The above examples illustrate an improved method for producing anhydrous uranium pentafluoride, UF₅, by reacting uranium pentachloride, uranium hexachloride or mixtures thereof with anhydrous fluoride. When heated the uranium pentafluoride disproportionated readily according to the following reaction:

$$2UF_5 \rightarrow UF_6 + UF_4$$

While in the examples the reaction mixture was allowed to stand from two to seventeen hours after being heated to 25° C., this period of standing is not critical. As is illustrated, this period may vary over a wide range. All that is essential, however, is to allow sufficient time for the reaction to become complete, which is preferably at least two hours.

The reaction is preferably conducted at a temperature within the range of between −33° C. and 25° C. However, if suitable pressure equipment is used, higher temperatures may be employed. As is illustrated in Example 1, a convenient method is to allow the reaction mixture to slowly rise from Dry Ice temperature at which the anhydrous hydrogen fluoride was condensed upon the uranium pentachloride, until the temperature has risen to about 25° C. While Dry Ice temperature may be as low as −78° C., as the reaction mixture is allowed to slowly rise in temperature, the reaction begins at about −33° C. and continues as the temperature is allowed to rise to 25° C.

In the present process reactants are kept completely dry as water reacts readily with the higher fluorides and chlorides and if necessary it is important to provide drying means for all of the reactants so as to prevent all access of moisture.

A convenient procedure for preparing anhydrous hydrogen fluoride from commercially available hydrogen fluoride consists in condensing, at a temperature of about −70° C., a desired quantity of commercial hydrogen fluoride in a container, i. e. preferably a nickel or copper vessel, containing uranium pentachloride. The contents of the container is then allowed to rise to about room temperature, at which temperature the water reacts with the uranium pentachloride to form uranium oxychloride and gaseous hydrogen chloride. The container is then cooled to about −70° C., at which temperature the hydrogen fluoride is condensed to a liquid, and the gaseous hydrogen chloride is removed. The anhydrous liquid hydrogen fluoride is then ready for use.

The type of reaction vessel may vary over a wide range, and various types are commercially available. However, because of the corrosive substances present in the reaction vessel, a nickel reaction vessel has been found to be particularly efficient. If desired, the nickel reaction vessel may be lined for example with platinum to eliminate any formation of nickel fluoride, NiF₂.

In carrying out the reaction, a charge of uranium pentachloride, uranium hexachloride, or mixtures thereof is placed in a suitable reaction vessel, for example a platinum-lined nickel reaction vessel. It is essential that the reaction vessel be provided with evacuating means, although any conventional evacuation means may be used. A convenient method of bringing the anhydrous hydrogen fluoride in contact with the uranium chloride is, for example, by introducing gaseous anhydrous fluoride into the reaction vessel and allowing it to condense on the uranium chloride at Dry Ice temperature. It will be understood that Dry Ice temperature may vary somewhat with the particular medium used, but in general will be from about −60° C. to −70° C. After the hydrogen fluoride has been condensed upon the uranium chloride, the reaction vessel should be again sealed and slowly warmed to a temperature of about 25° C. The reaction will occur as the temperature reaches about −33° C., and will continue as the temperature is raised to about 25° C.

The rate of heating may vary, but generally it is preferred to slowly warm the reaction mixture and allow the temperature to rise to 25° C. over a period of 1 hour. The reaction mixture is then allowed to stand, with occasional shaking for a period, for example, from 2 to 17 hours.

After the reaction is complete, excess hydrogen fluoride and gaseous reaction products may be removed by heating the reaction product at a temperature of about 25° C., under a vacuo of from $1 \times 10^{-3}$ mm. Hg. If desired a stream of nitrogen may be introduced to sweep out the major portion of the excess hydrogen fluoride before the vacuum is applied. However, the pre-treatment with nitrogen will not eliminate the necessity of heating the reaction product in vacuo to remove the remainder of the hydrogen fluoride which cannot be completely removed by sweeping with an inert gas. After the excess hydrogen fluoride and gaseous reaction products are removed, the remaining product is anhydrous uranium pentafluoride, UF₅, which is white in color.

Thus, by the process of this invention, there is provided an improved method for producing substantially pure anhydrous uranium pentafluoride which can by disproportionation be separated into substantially pure UF₄ and UF₆.

It is to be understood that the above particular description is by way of illustration, and that changes, omissions, additions, substitutions and/or modifications might be made within the scope of the claims without departing from the spirit of the invention which is intended to be limited only as required by prior art.

I claim:

1. A process for preparing uranium pentafluoride which comprises reacting a material selected from the group consisting of uranium pentachloride, uranium hexachloride and mixtures thereof with anhydrous hydrogen fluoride at a temperature within the range of between −33° C. and 25° C., subsequently heating the reaction products at a temperature of about 25° C. under a vacuo of $1 \times 10^{-3}$ mm. Hg to drive off unreacted hydrogen fluoride and gaseous reaction products, and then recovering anhydrous uranium pentafluoride.

2. A process for preparing uranium pentafluoride which comprises reacting uranium pentachloride with anhydrous hydrogen fluoride at a temperature within the range of between −33° C. and 25° C., subsequently heating the reaction products at a temperature of about 25° C. under a vacuo of $1 \times 10^{-3}$ mm. Hg to drive off unreacted hydrogen fluoride and gaseous hydrogen chloride, and then recovering anhydrous uranium pentafluoride.

3. A process for preparing uranium pentafluoride which comprises reacting uranium hexachloride with anhydrous hydrogen fluoride at a temperature within the range of between —33° C. and 25° C., subsequently heating the reaction products at a temperature of about 25° C. under a vacuo of $1 \times 10^{-3}$ mm. Hg to drive off unreacted hydrogen fluoride and gaseous hydrogen chloride and chlorine, and then recovering anhydrous uranium pentafluoride.

4. A process for preparing uranium pentafluoride which comprises reacting a mixture of uranium pentachloride and uranium hexachloride with anhydrous hydrogen fluoride at a temperature within the range of between —33° C. and 25° C., subsequently heating the reaction products at a temperature of about 25° C. under a vacuo of $1 \times 10^{-3}$ mm. Hg to drive off unreacted hydrogen fluoride and gaseous hydrogen chloride and chlorine, and then recovering anhydrous uranium pentafluoride.

CHARLES J. CARIGNAN.

REFERENCES CITED

The following references are of record in the file of this patent:

UNITED STATES PATENTS

| Number | Name | Date |
|---|---|---|
| 1,403,183 | Milligan | Jan. 10, 1922 |
| 1,826,806 | Marden et al. | Oct. 13, 1931 |
| 2,382,788 | Gorin | Aug. 14, 1945 |
| 2,388,135 | Frey | Oct. 30, 1945 |

OTHER REFERENCES

Chem. Abstracts, vol. V, 1911, page 3772, Otto Ruff and Alfred Heinzelman, Danzig Z. Anorg. Chem. 72, pages 63–84.

Mellor: "Comprehensive Treatise on Inorganic and Theoretical Chemistry," Vol. 12, 1932, page 75. (Copy in Division 59.)